US011263812B2

(12) United States Patent
Poliwoda et al.

(10) Patent No.: US 11,263,812 B2
(45) Date of Patent: Mar. 1, 2022

(54) COMPUTER-IMPLEMENTED METHOD FOR COMPRESSING A DIGITAL REPRESENTATION OF AN OBJECT

(71) Applicant: Volume Graphics GmbH, Heidelberg (DE)

(72) Inventors: Christoph Poliwoda, Mannheim (DE); Thomas Gunther, Heidelberg (DE); Christof Reinhart, Heidelberg (DE)

(73) Assignee: Volume Graphics GmbH, Heidelberg (DE)

( * ) Notice: Subject to any disclaimer, the term of this patent is extended or adjusted under 35 U.S.C. 154(b) by 112 days.

(21) Appl. No.: 16/500,730

(22) PCT Filed: Apr. 13, 2018

(86) PCT No.: PCT/EP2018/059575
§ 371 (c)(1),
(2) Date: Oct. 3, 2019

(87) PCT Pub. No.: WO2018/206224
PCT Pub. Date: Nov. 15, 2018

(65) Prior Publication Data
US 2020/0118300 A1    Apr. 16, 2020

(30) Foreign Application Priority Data
May 12, 2017    (DE) .................... 10 2017 110 338.4

(51) Int. Cl.
*G06T 7/00*        (2017.01)
*G06T 9/20*        (2006.01)
*G06T 17/20*       (2006.01)

(52) U.S. Cl.
CPC .......... *G06T 17/205* (2013.01); *G06T 7/0006* (2013.01); *G06T 9/20* (2013.01); *G06T 2207/10081* (2013.01)

(58) Field of Classification Search
None
See application file for complete search history.

(56) References Cited

U.S. PATENT DOCUMENTS

| 8,245,411 B2* | 8/2012 | Wang .................... G01B 5/201 |
| | | 33/551 |
| 2004/0101162 A1 | 5/2004 | Higaki et al. |

(Continued)

OTHER PUBLICATIONS

S.F. Frisken Gibson, R.N. Perry, A.P. Rockwood, and T.R. Jones, "Adaptively Sampled Distance Fields: A General Representation of Shape for Computer Graphics," Proc. SIGGRAPH '00, pp. 249-254, 2000 (Year: 2000).*

(Continued)

*Primary Examiner* — Tahmina N Ansari
(74) *Attorney, Agent, or Firm* — SoCal IP Law Group LLP; Angelo Gaz

(57) ABSTRACT

Described is compressing a digital representation of an object, wherein the object representation comprises image information items for the object that each specify a value of a measurand for the object at a defined position of the object. Compressing includes determining the object representation, determining a distance field from the image information items of the object representation that comprises a plurality of data points in a grid, the distance field assigns at least one distance value to each of the data points that in each case indicate the shortest distance of the data point from a closest material boundary of the object, determining a near region around a material boundary of the object, determining a sub-set of data points of the distance field which lie outside the near region, deleting the sub-set of data points, and saving the distance field in the form of a compressed object representation.

17 Claims, 5 Drawing Sheets

(56) References Cited

U.S. PATENT DOCUMENTS

| | | | | |
|---|---|---|---|---|
| 2014/0007394 | A1* | 1/2014 | Haas | C21D 7/04 |
| | | | | 29/90.01 |
| 2014/0342176 | A1* | 11/2014 | Appleby | B22C 9/04 |
| | | | | 428/596 |
| 2016/0307368 | A1* | 10/2016 | Akeley | G06T 9/00 |
| 2018/0236722 | A1* | 8/2018 | Susnjara | B29C 64/194 |
| 2018/0281126 | A1* | 10/2018 | Glimpel | B23C 5/10 |
| 2020/0118300 | A1* | 4/2020 | Poliwoda | G06T 7/0006 |

OTHER PUBLICATIONS

M.W. Jones, "Distance Field Compression," The J. WSCG, vol. 12, No. 2, pp. 199-204, 2004 (Year: 2004).*

Gunnarsson, Jonny, "Algorithms for representation of 3D regions in radiotherapy planning software," Uppsala Universitet, Apr. 2013. 60 pages.

Han, Shuchu et al., "Hexahedral Shell Mesh Construction via Volumetric Polycube Map," School of Computer Engineering, Nanyang Technological University, Singapore. pp. 127-136.

Sagawa, Ryusuke et al, "Hole Filling of a 3D Model by Flipping Signs of a Signed Distance Field in Adaptive Resolution," IEEE Transactions on Pattern Analysis and Machine Intelligence, vol. 30, No. 4, Apr. 2008. 14 pages.

Canelhas, Daniel et al. "From Feature Detection in Truncated Signed Distance Fields to Sparse Stable Scene Graphs," IEEE Robotics and Automation Letters, vol. 1, No. 2, Jul. 2016. 8 pages.

European Patent Office, International Search Report and Written Opinion for PCT Application No. PCT/EP2018/059575. dated Jul. 9, 2018.

Novotny, Pavol, "Voxelization of Solids with Sharp Details Dissertation Thesis," Comenius University in Bratislava, Department of Applied Informatics, Bratislava 2007. 110 pages.

German Patent Office, Office Action for German Patent Application No. 10 2017 110 338.4, dated Feb. 20, 2018.

* cited by examiner

COMPUTER-IMPLEMENTED METHOD FOR COMPRESSING A DIGITAL REPRESENTATION OF AN OBJECT

RELATED APPLICATION INFORMATION

This patent claims priority from International PCT Patent Application No. PCT/EP2018/059575, filed Apr. 13, 2018 entitled, "COMPUTER-IMPLEMENTED METHODS FOR COMPRESSING A DIGITAL REPRESENTATIVE OF AN OBJECT", which claims priority to German Patent Application No. 10 2017 110 338.4, filed May 12, 2017 all of which are incorporated herein by reference in their entirety.

BACKGROUND

Field

The invention relates to a computer-implemented method for compressing a digital representation of an object.

Description of the Related Art

The demand for algorithms for compressing digital representations of objects is ubiquitously recognizable in the prior art. For example, in the case of the examination of objects, such as workpieces, by means of a computer tomograph, data sets are generated, the size of which can rapidly exceed multiple gigabytes per examined workpiece. Very large quantities of data can thus result very rapidly in the field of in-line workpiece testing by means of a nondestructive measurement of the workpieces, which makes efficient testing and in particular archiving of the test results impractical.

Compression algorithms for such measurement data, for example, as result during the testing of workpieces with the aid of computer tomography, are known in manifold embodiments in the prior art. In particular in the field of workpiece testing, it always has to be ensured by such a compression algorithm that the information loss due to a compression of the corresponding data sets does not exceed a narrowly limited tolerance range. Otherwise, the compressed measurement data could not be used, for example, for a subsequent, reliable analysis of the examined workpieces.

SUMMARY

Against this background, the present invention is based on the object of providing an improved method for compressing a digital representation of an object, which overcomes the above-mentioned disadvantages of the prior art.

The main features of the invention are specified in this document and the corresponding figures.

In a first aspect, the invention relates to a computer-implemented method for compressing a digital representation of an object, wherein the object representation comprises a plurality of items of image information of the object. In this case, an item of image information indicates a value of a measured variable for the object at a defined position of the object. The method comprises the following steps in this case:

In a first method step, the object representation is firstly ascertained. Subsequently, a distance field is ascertained from the items of image information of the object representation, wherein the distance field comprises a plurality of data points arranged in a raster. The distance field assigns at least one distance value to each of the data points in this case, wherein the distance value respectively specifies the shortest spacing of the data point to a closest material boundary surface of the object. Subsequently, a near region around a material boundary surface of the object is ascertained. Proceeding from this near region, a subset of data points of the distance field is then ascertained, which are located outside the near region of the material boundary surface. The subset of data points thus ascertained is then deleted from the distance field and the distance field is stored as a compressed object representation.

The represented object can be, for example, a workpiece such as a component for a machine or a vehicle. This can be digitally represented in an initially arbitrary manner. For example, the digital representation can be an image of the object obtained from a measurement. In this case, properties of the object are depicted on the basis of items of image information by the image of the object or by the digital representation of the object. The measured variables coded by the image information can represent, for example, the type of the material of the object in specific regions. The image of the object can be both two-dimensional and also three-dimensional.

A material boundary surface of such an object is to be understood in this case as the transition from a first material to a second material. For example, a material boundary surface may be an outer edge of the material, at which the material of the object, for example, a metal, merges into the air surrounding the object. A surface of the object can thus be represented by material boundary surfaces. Furthermore, a material boundary surface can also exist inside an object, for example, if different regions of the object consist of different materials. The shortest spacing of a data point to such a material boundary surface ascertained in the course of the determination of the distance field extends in this case originating from a material boundary surface, generally perpendicularly to this material boundary surface, to the data point to which the distance value is finally assigned.

The near region used to ascertain the subset of data points which can subsequently be deleted from the distance field describes in the broadest meaning surroundings around a material boundary surface of the object. The near region can be defined in various ways in this case, which will be explained in greater detail hereafter. The deletion of the data points can comprise in this case both the removal of the data points from a data set, and also the overwriting of the distance values assigned to the data points with a predefined value.

The above-described method is based on the finding that in the case of a representation of an object as a distance field, data points which exceed a certain spacing to a material boundary surface of the represented object cannot provide any additional information for a representation of the material boundary surfaces of the object. Rather, the information assigned thereto with respect to the location of a material boundary surface can typically also be derived from the entirety of the data points which are closer to the material boundary surface. Therefore, data points which are arranged outside a certain region around a material boundary surface can be deleted from the distance field representing the object without an information loss with respect to the geometry of the object being a concern in this way. Overall, a way for a lossless compression of a digital representation of the object is accordingly provided by the method according to the invention. If the object is, for example, a solid metal body, the complete object can be reconstructed from the knowledge of the material boundary surfaces. The representation of an object as a distance field is therefore sufficient to represent the entire object.

The above-described reconstruction of the distance information, which is coded in a data point outside the near region, from the data points which are arranged inside the near region, is in particular possible with little effort if, according to one embodiment, the raster of the distance field is an orthogonal grid. An orthogonal grid is to be understood in this case as any grid in which the connecting lines of adjacent data points are always orthogonal in relation to one another. In such a grid, from the knowledge of the distance value of one set of data points, the distance value of another data point in its immediate surroundings can be inferred from simple trigonometric considerations. An orthogonal grid is therefore particularly advantageous for coding the surface of an object.

According to one preferred embodiment, it is furthermore an isotropic grid in this case, which further facilitates the reconstruction of a distance value of a data point. An isotropic grid is to be understood in this case as a grid which, proceeding from a specific data point, continues the grid in identical form in every direction. One example of such an isotropic, orthogonal grid is, for example, an arrangement of data points at the respective corners of regularly arranged cubes.

However, it is entirely possible that according to one embodiment the size of elementary cells of the raster of the distance field is locally different. An "elementary cell" of the raster is to be understood in this case as a cell, i.e., a group of adjacent data points, from which the grid can be constructed in a specific region. In the above-mentioned example of an isotropic, orthogonal grid, the elementary cell of the grid would be a cube. In an anisotropic grid, in contrast thereto, there is a variety of local elementary cells, from which the distance field is constructed in at least one subregion. In a strongly anisotropic grid, it is even possible that the grid is exclusively constructed from different local elementary cells.

Due to a variable size of the elementary cells of a grid, in regions in which the surface of the represented object is substantially homogeneous, for example, is planar, a loose-meshed raster can be selected, without an information loss being a concern in this way. In regions in which the object has a strongly inhomogeneous surface, for example, strongly curved regions or corners or waves, in contrast, the raster of the distance field can be selected as very tight-meshed, to ensure a sufficiently accurate representation of the object. The definition of regions and/or corresponding dimensions of elementary cells of the grid can be derived both automatically from the represented object and also predetermined by an external user input in this case.

As already stated above, the near region can be ascertained in various ways. For example, according to a first embodiment, the near region of a material boundary surface is defined by a limiting value for a distance value of a data point, wherein the respective distance values of the data points of the subset of data points are greater than the limiting value. The width of surroundings around the material boundary surface is effectively defined by this procedure and all data points, the distance value of which is greater than the defined limiting value, which are thus located outside the surroundings, are deleted from the distance field. The described embodiment has the advantage in this case that the definition of a limiting value and the subsequent selection of data points, the distance value of which is greater than this distance value, is very easy to implement and results in a low computer expenditure. In this case, the limiting value can generally initially be freely defined.

For the definition of the limiting value, it is provided according to a further embodiment in this case that the limiting value for the spacing corresponds to the maximum spacing between two points within a local elementary cell of the raster of the distance field, within which a material boundary surface extends. An "elementary cell" of the raster is also again to be understood here as a cell from which the raster can be constructed. By the definition of the limiting value as the maximum spacing between two points within such a local elementary cell, effectively all of those data points are excluded by the limiting value which are at a greater distance than at least more than one elementary cell from the material boundary surface. For such data points, it is always ensured in this case in the case of an isotropic grid that a data point exists which is arranged closer to the material boundary surface, so that the data points at a greater distance by at least one elementary cell from the material boundary surface cannot provide additional information for the definition of the material boundary surface.

According to an alternative embodiment thereto, the limiting value can also be predetermined by a user input. For example, for this purpose the represented object can be presented to a user on a display screen, wherein the user can define corresponding limiting values for various regions of the object. In this case, the user can cause, for example, his specific technical knowledge with respect to the geometry of the object to be incorporated into the definition of the limiting value.

In a further embodiment, the limiting value for the spacing can have a different numeric value in each case for different regions of the object representation. This results automatically, for example, if the limiting value, as stated above, is defined as a maximum spacing within an elementary cell, wherein the size of the elementary cells of the raster of the distance field is locally different. By way of a variable definition of the limiting value for the spacing, local geometric properties of the object and/or the surface thereof can be taken into consideration in this case.

The different regions in which different limiting values for the spacing are defined can be defined in this case according to one embodiment by a user input.

As already stated above, in addition to the above-described approach of defining a limiting value for a spacing of the data points in relation to the material boundary surface, there are further options for establishing the near region. For this purpose, it is provided according to a further embodiment that to ascertain the subset of data points, firstly the raster of the distance field is divided into a plurality of raster cells, wherein one raster cell is delimited by data points at its respective corner points. Subsequently, a subset of raster cells is ascertained from the plurality of raster cells, within which a material boundary surface extends. Data points which do not delimit a raster cell from the subset of raster cells are then assigned to the subset of data points which are subsequently deleted from the distance field.

By way of the above-described method, the distance field is essentially reduced to the total of all raster cells within which a material boundary surface extends. This method can be advantageous in particular if the raster, as stated above, is a non-isotropic grid, the elementary cells of which can have different sizes locally. The raster cells of the raster of the distance field can initially be freely defined in this case.

According to one preferred embodiment, however, it is provided that the raster cells are elementary cells of the grid used as the raster. The selection of elementary cells as raster cells has the advantage in this case that the closest possible region around a material boundary surface is maintained as the distance field, so that the achievable compression of the digital representation is optimized.

As already stated above, the described approach for the definition of a near region is based on the ascertainment of raster cells, within which a material boundary surface extends. According to one embodiment, the ascertainment of the subset of raster cells within which a material boundary surface extends can be implemented, for example, by firstly selecting one raster cell from the plurality of raster cells and subsequently ascertaining pairs of data points delimiting the raster cell. For the pairs thus ascertained, the relative spacings of the data points of the pairs from one another are then ascertained in each case, and also the total of the distance values of the data points of a pair is ascertained. If the total of the distance values is less than the ascertained relative spacing for at least two of the pairs of data points of the selected raster cell, the raster cell is assigned to the subset of raster cells and the above-described method sequence is repeated for the plurality of raster cells. The above-described approach is based on the finding that the total of the distance values of adjacent data points is always less than their spacing from one another precisely when a material boundary surface extends between the two data points. It can thus be ascertained in a simple manner whether a material boundary surface is arranged within a raster cell.

In an alternative approach thereto, according to one embodiment, the distance field can also code the distance values in another manner. It could thus be provided, for example, that the distance values of the data points assume positive values on a first side of a material boundary surface, while the distance values assume negative values on another side of the material boundary surface. Such a coding of the distance values is also known as a "signed distance field" (SDF). If the distance values of the distance field are thus coded, a raster cell within which a material boundary surface extends can also be ascertained, for example, by ascertaining pairs of adjacent data points, between which a sign change of the assigned distance values takes place. This is because such a sign change only takes place if a material boundary surface is arranged between the data points. The above-described subset of raster cells can also be ascertained in a simple manner by this approach.

If the distance values of a distance field are solely provided without corresponding sign, it can be provided according to one embodiment that the unsigned distance values of the distance field are converted into signed distance values, so that, for example, the above-described ascertainment of raster cells on the basis of an existing sign change of the assigned distance values becomes possible. For this purpose, the distance values of the distance field can be changed in such a way that the respective absolute values of the distance values are not changed, but the gradient of the distance field is equal to 1 at every point of the distance field.

According to a further embodiment, the ascertainment of the distance field can be implemented in that firstly the location of material boundary surfaces is ascertained from the items of image information of the object representation. Subsequently, the material boundary surface closest to a data point is ascertained for each of the data points and the respective spacing of the data points from the respective closest material boundary surface is ascertained. Subsequently, the spacing thus ascertained is assigned to the respective data points as a distance value. The location of the material boundary surfaces can be ascertained in this case according to routine methods from the items of image information of the object representation. The above-described approach describes a simple way of deriving a distance field from an object representation.

According to one preferred embodiment, the object representation is a rastered representation of the object, wherein the rastered representation comprises a plurality of measurement points of a measurement of the object arranged in a raster, wherein a measurement point comprises at least one item of image information. The measurement can in this case be any arbitrary imaging method which enables imaging of the object. For example, an object can be represented by a magnetic resonance tomograph. The raster of the measurement points can assume any arbitrary shape in this case. In particular, the raster can differ from the raster of the distance field.

According to one preferred embodiment, however, the measurement points of the rastered representation are arranged in a regular grid, which corresponds to the raster of the distance field according to a further embodiment.

According to a further preferred embodiment, the measurement from which the measurement points of the object representation result is a computer tomography measurement, wherein the image information of a pixel indicates the x-ray density of the material of the object at the point of the pixel.

In a further aspect, the invention relates to a computer program product having instructions executable on a computer, which instructions, when executed on a computer, cause the computer to carry out the method according to one of the preceding claims.

DESCRIPTION OF THE DRAWINGS

Further features, details, and advantages of the invention result from the wording of the claims and from the following description of exemplary embodiments on the basis of the drawing. In the figures:

Features which are similar to one another or identical are identified by identical reference signs hereafter.

DETAILED DESCRIPTION

Figure 1:
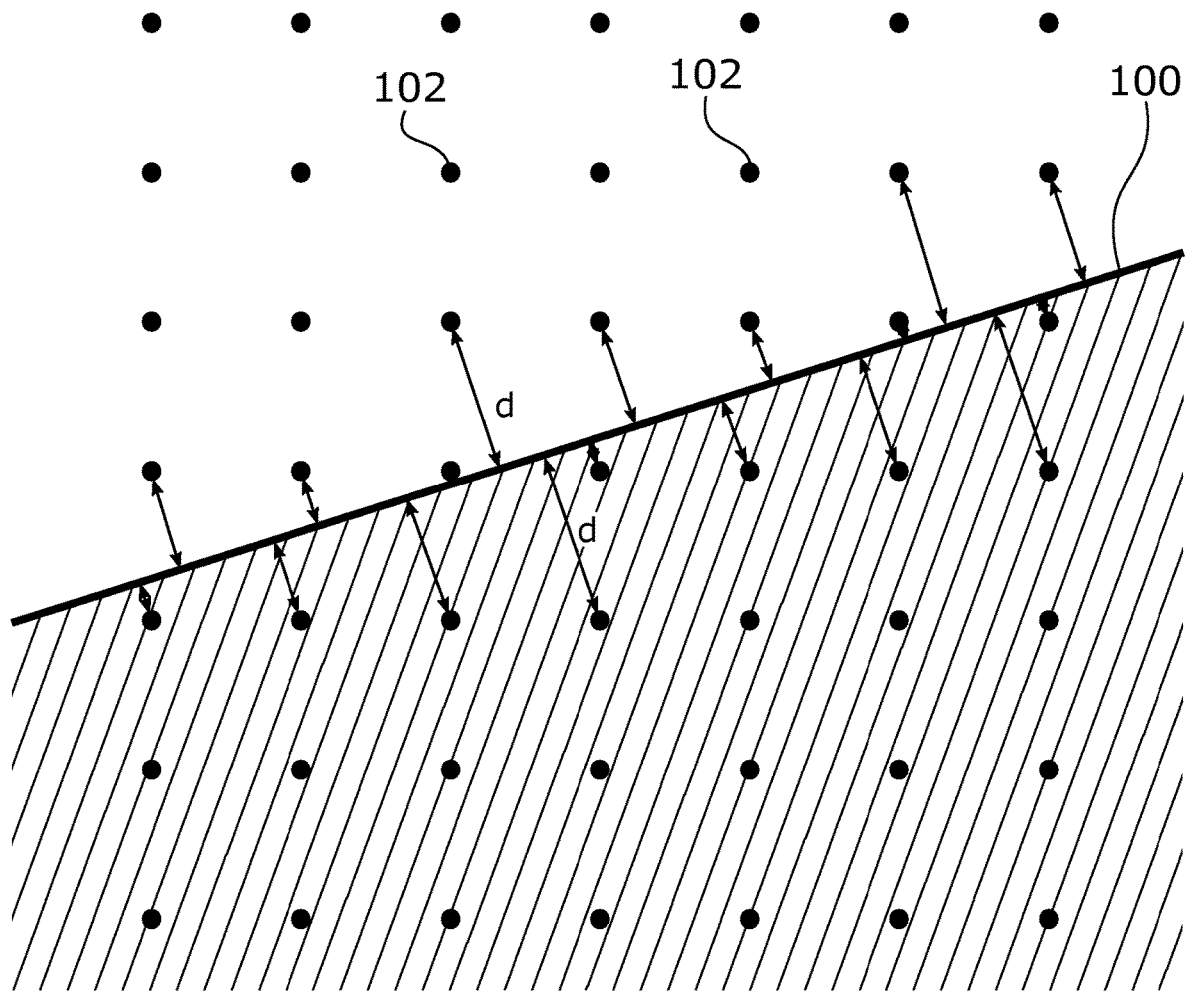
FIG. 1 shows a schematic illustration of an object representation having a distance field.

FIG. 1 shows a schematic illustration of an object representation, wherein the object representation is overlaid with a distance field. In the illustrated embodiment, the object is essentially represented by its material boundary surface 100, which extends diagonally through the image detail. For example, the material boundary surface 100 can be the transition at which a first material of a represented object adjoins the surrounding air. The represented object can be, for example, a workpiece, which consists of a metal or a plastic.

As was already stated above, the object representation is overlaid by a distance field. The distance field is represented in the illustrated embodiment essentially by data points 102, which are overlaid on the object representation in a regular isotropic raster. In addition to the orthogonal raster shown in FIG. 1, a raster for representing a distance field could comprise any arbitrary geometry which is suitable for forming a continuous raster. Furthermore, it is to be noted that the two-dimensional representation selected in FIG. 1 was selected solely because it is simpler to illustrate. The described substantive matters are also similarly transferable to three-dimensional representations of an object. Thus, for example, a two-dimensional raster made of square cells is shown in FIG. 1, which can be readily transferred into a third dimension, in which the raster would be constructed by uniform cubes.

The individual data points 102 of the distance field are assigned distance values, which describe how large the minimum spacing is between a data point 102 and the material boundary surface 100. The minimum spacing between a data point 102 and the material boundary surface 100 generally extends perpendicularly in relation to the material boundary surface 100. The distances for a subset of the data points 102, which are located in the immediate surroundings of the material boundary surface 100, are illustrated by way of example in FIG. 1.

As already stated above, a core concept of the invention is that data points 102 which are at a sufficiently large distance from a material boundary surface 100 do not provide any further contribution to the exactness of the representation of the material boundary surface 100 if one compares the information content thereof to that of the data points 102 in the immediate surroundings of the material boundary surface 100. Proceeding from this finding, two options are shown hereafter for how data points 102 can be selected, which are not required for the representation of a material boundary surface 100.

Figure 2:
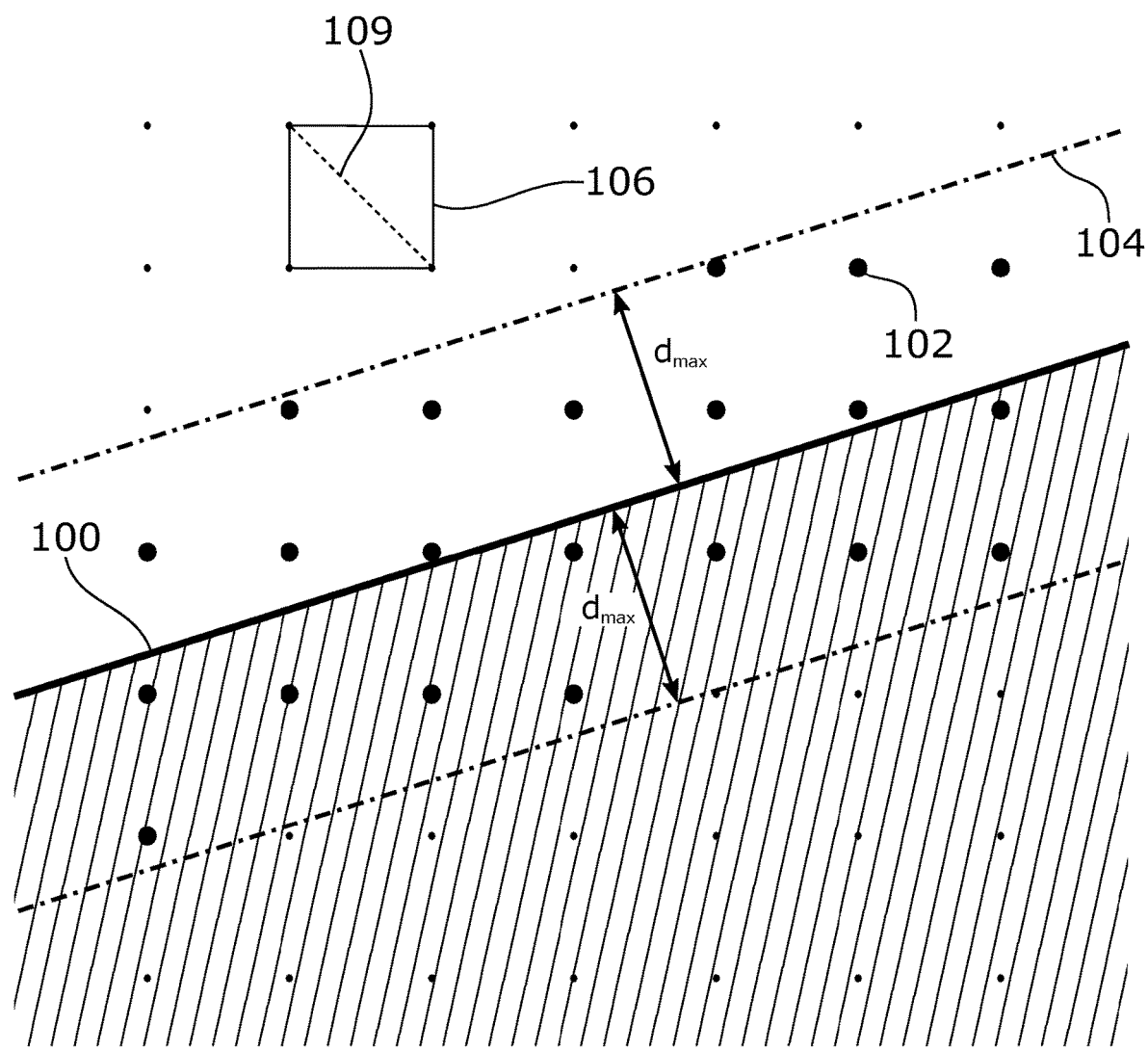
FIG. 2 shows a schematic illustration of the selection of data points of the distance field on the basis of a limiting value for the distance value.

For this purpose, the material boundary surface 100 of FIG. 1 is schematically shown in FIG. 2 having the corresponding data points 102, wherein a band of defined width $d_{max}$ is shown around the material boundary surface 100. FIG. 2 illustrates the approach for selecting data points 102 to be deleted on the basis of a limiting value for the spacing of a data point 102 from the material boundary surface 100. In the illustrated case, this limiting value is established by the value $d_{max}$. Since the illustrated band 104 is always located spaced apart by exactly the spacing $d_{max}$ from the material boundary surface 100, all data points 102 within the band 104 meet the condition that the distance value thereof is less than the limiting value $d_{max}$. The information assigned thereto in the form of a distance value is therefore relevant for representing a material boundary surface 100.

All data points 102 which are located outside the band 104, however, are sufficiently far away from the material boundary surface 100 that a data point 102 always exists which is closer to the material boundary surface 100 and specifies the location of the material boundary surface 100 sufficiently accurately. Therefore, all data points which are arranged outside the band 104 can be deleted from the set of the data points 102 of the distance field, without the accuracy of the representation of the material boundary surface 100 by the distance field being reduced. The deletion of the data points 102 is shown in FIG. 2 in that the data points 102 outside the band 104 are shown smaller than the data points 102 inside the band 104.

The value of the limiting value $d_{max}$ for the spacing of a data point 102 from the material boundary surface 100 can be established, for example, by a user input. For this purpose, for example, after ascertainment of the object representation, the object representation can be presented to a user, for example, on a monitor, so that a user can mark and/or establish regions inside the object representation and corresponding limiting values $d_{max}$ for the spacing of the data points 102 from the material boundary surface 100. Alternatively, the limiting value $d_{max}$ can also be derived from the properties of the distance field itself. It is thus provided according to one above described embodiment that the distance value $d_{max}$ corresponds precisely to the maximum spacing of two points within an elementary cell of the grid. Such an elementary cell 106 is shown by way of example in the top left image region in FIG. 2. The elementary cell 106 is delimited at each of its corners by a data point 102 in this case and is dimensioned so that the complete grid of the distance field can be constructed from a juxtaposition of the elementary cells 106. In this case, for example, the maximum spacing of two data points 102 within an elementary cell 106 can be used for the definition of the limiting value $d_{max}$. In the example shown in FIG. 2, the maximum spacing of two data points 102 within an elementary cell 106 is the length of diagonal 109 of the elementary cell 106. Every data point 102 which is farther away from the material boundary surface 100 than the length of the diagonal 109 of the elementary cell 106 is thus always far enough away from the material boundary surface 100 that another data point 102 is located closer to the material boundary surface 100 and is therefore sufficient to establish the location of the material boundary surface 100 with sufficient accuracy.

Figure 3:
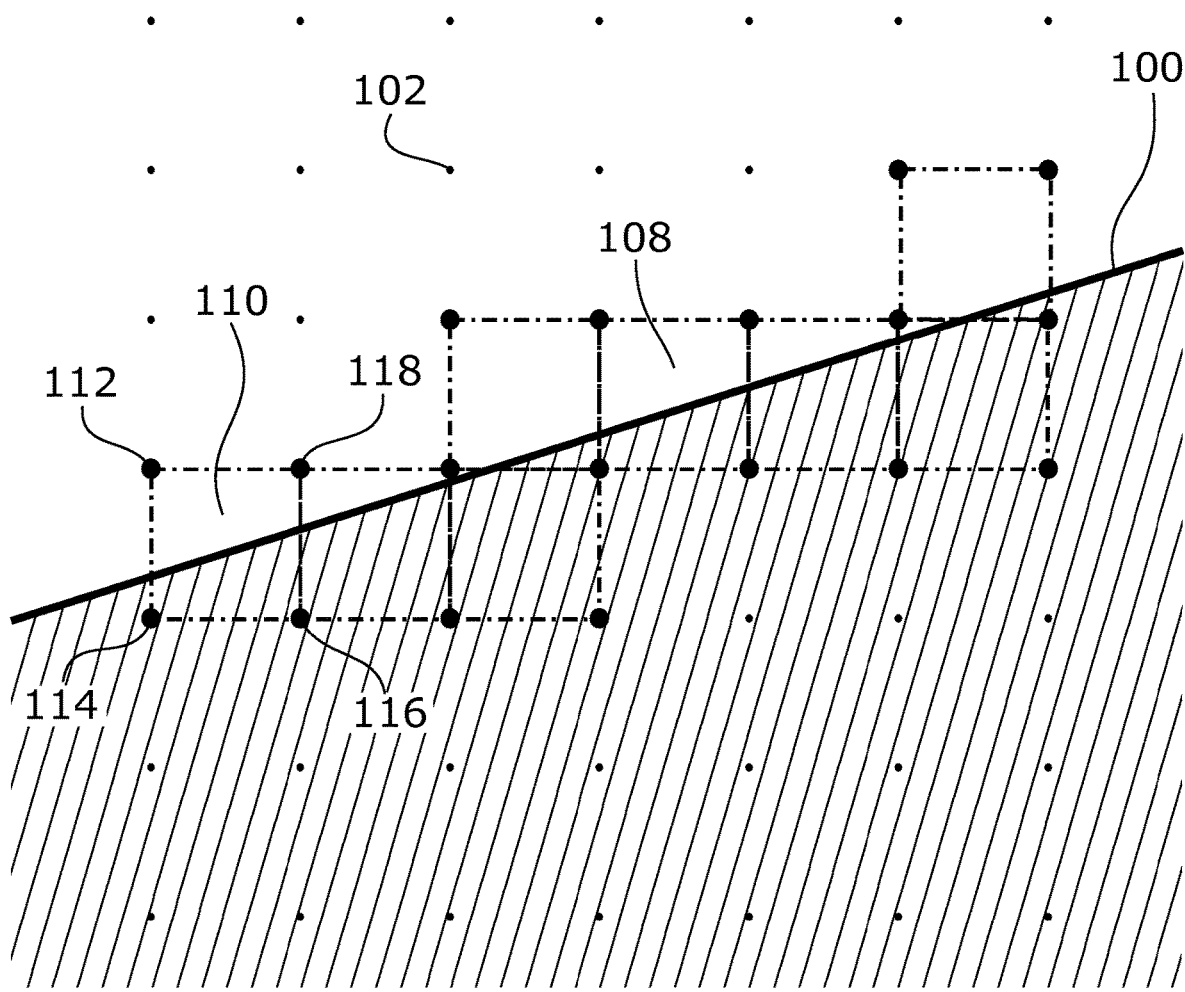
FIG. 3 shows a schematic illustration of the selection of data points of the distance field on the basis of the selection of raster cells.

FIG. 3 shows an alternative approach to FIG. 2, using which a subset of data points 102 can be ascertained, which are sufficient for representing the location of the material boundary surface 100. In this case, FIG. 3 proceeds from the same situation as FIGS. 1 and 2, in which a material boundary surface 100 extends diagonally through the image detail and is overlaid by a distance field. In the approach illustrated in FIG. 3, data points 102 are selected by raster cells 108 being ascertained, within which the material boundary surface 100 extends. A raster cell 108 is to be understood in this case as a cell of the raster or grid of the distance field, which is delimited at each of its corners by a data point 102. In this case, a raster cell can certainly be an elementary cell 106 of a raster or grid, as schematically shown in FIG. 2. However, it is also possible that the raster cells 108 are selected in another manner.

In the approach illustrated in FIG. 3, elementary cells 106 of the grid are selected as raster cells 108. Furthermore, in FIG. 3, all of the raster cells 108 are shown through which the material boundary surface 100 extends. According to the invention, proceeding from the raster cells 108 thus shown, all of the data points are maintained which delimit at least one raster cell 108 through which a material boundary surface 100 extends. All further data points 102, which do not delimit such a raster cell 108, are deleted from the data set of the distance field.

The following procedure can be used to ascertain the raster cells 108, for example. Firstly, one raster cell 108 is selected from the set of the raster cells 108 of the distance field. By way of example, the raster cell 108 identified by 110 is set forth as an example. The raster cell 110 is delimited at its corners respectively by the data points 112, 114, 116, and 118. To establish whether a material boundary surface 100 extends through the raster cell 110, firstly pairs of data points are selected, which delimit the raster cell 110. For example, a first pair of data points can comprise the data points 114 and 116. For these two data points 114, 116, the sum of the distance values thereof is then ascertained, and also the relative spacing of the data points 114 and 116 from one another. If it is ascertained by the comparison of these two values that the relative spacing between the data points 114 and 116 is greater than the sum of the distance values thereof, it can be presumed that a material boundary surface 100 is arranged in the vicinity of the data points 114 and 116. A similar consideration is subsequently carried out for a further pair of data points 102 of the raster cell 110. For example, it is also ascertained from the consideration of the data points 112 and 114 that it has to be arranged in the vicinity of a material boundary surface 100. As soon as it has been established in each case for two pairs of data points 102 of a raster cell that a material boundary surface 100 is arranged in the near region, the material boundary surface 100 thus has to extend through the raster cell 110, which is delimited by the two pairs of data points 112 and 114 and also 114 and 116.

An alternative approach for ascertaining raster cells 108, within which a material boundary surface 100 extends, results from an alternative definition of the distance values. It can be provided for this purpose, for example, that distance values above the material boundary surface 100 are counted positively, while distance values below the material boundary surface 100 are counted negatively. To detect a material boundary surface 100 between two data points 102, it can then be ascertained whether a sign change of the respective assigned distance values exists from a first data point 102 to an adjacent second data point 102. If this is the case, a material boundary surface 100 has to be located between the data points.

As is furthermore shown in FIG. 3, all of the data points 102 which are not associated with one of the raster cells 108 within which a material boundary surface 100 extends are deleted from the data set. This is again shown by smaller data points.

Figure 4:
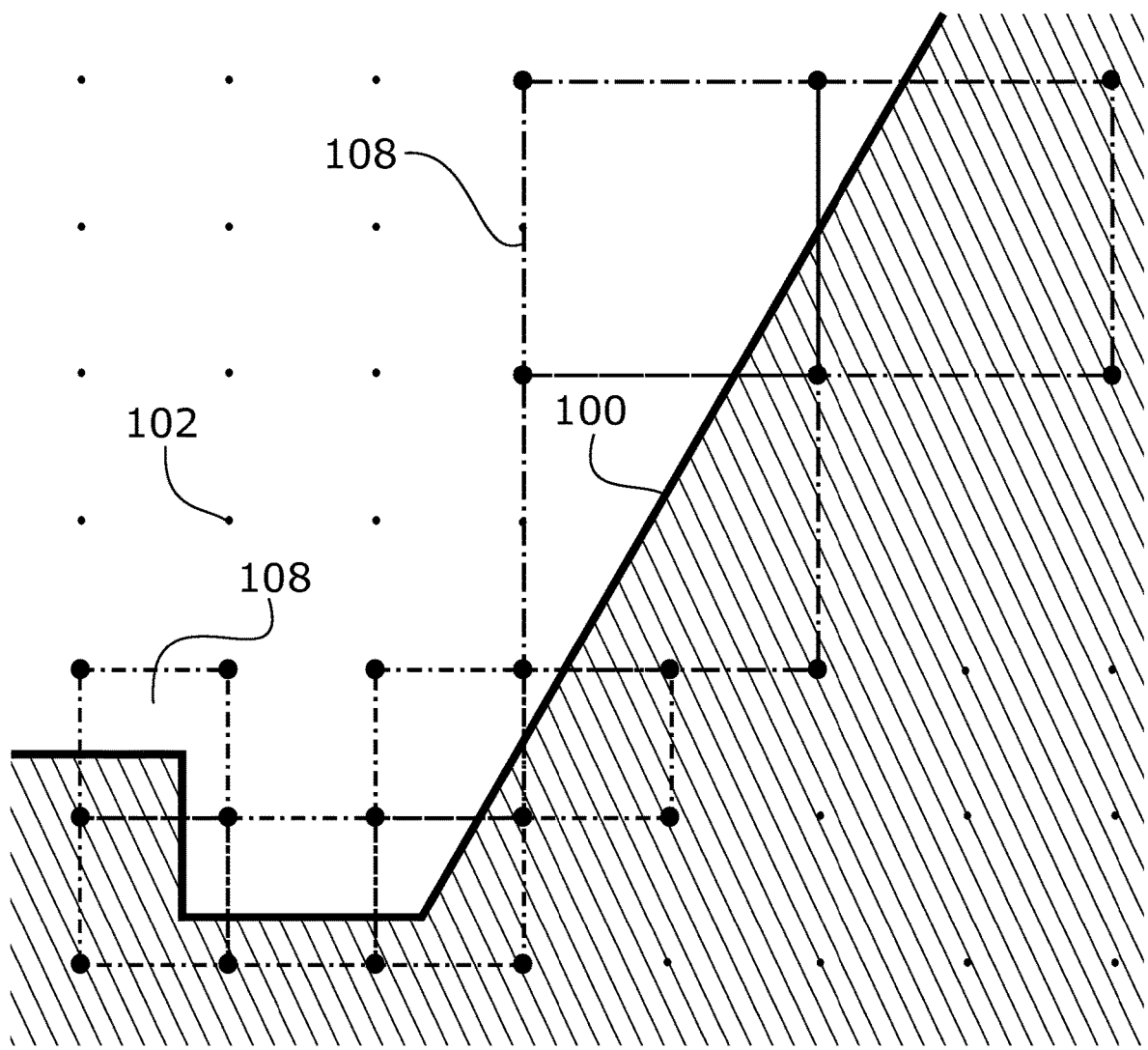
FIG. 4 shows a schematic illustration of a more complex object geometry having a raster of locally differing size of the distance field.

FIG. 4 shows a schematic illustration of a more complex geometry of an object and a variable size linked thereto of the raster to be used to represent the distance field. In FIG. 4, a sequence of multiple corners of the material boundary surface 100 is shown in a bottom left region of the illustrated image detail. To be able to represent this region with sufficient accuracy, a close rastering of the distance field is provided here. In a top right region of the selected image detail, in contrast, the material boundary surface 100 is constructed uniformly linearly over a large region, so that the size of the raster cells of the grid used for representing the distance field can be selected larger here. The adaptation of the size of the raster cells to the geometry of the represented object can be performed in this case, for example, by a user input. Alternatively thereto, it can also be provided that a computer system automatically recognizes, by way of an analysis of the material boundary surface 100 and/or its course, whether a raster cell or a mesh size of a grid has to be selected as coarse or fine to be able to code the represented object with sufficient accuracy.

Figure 5:
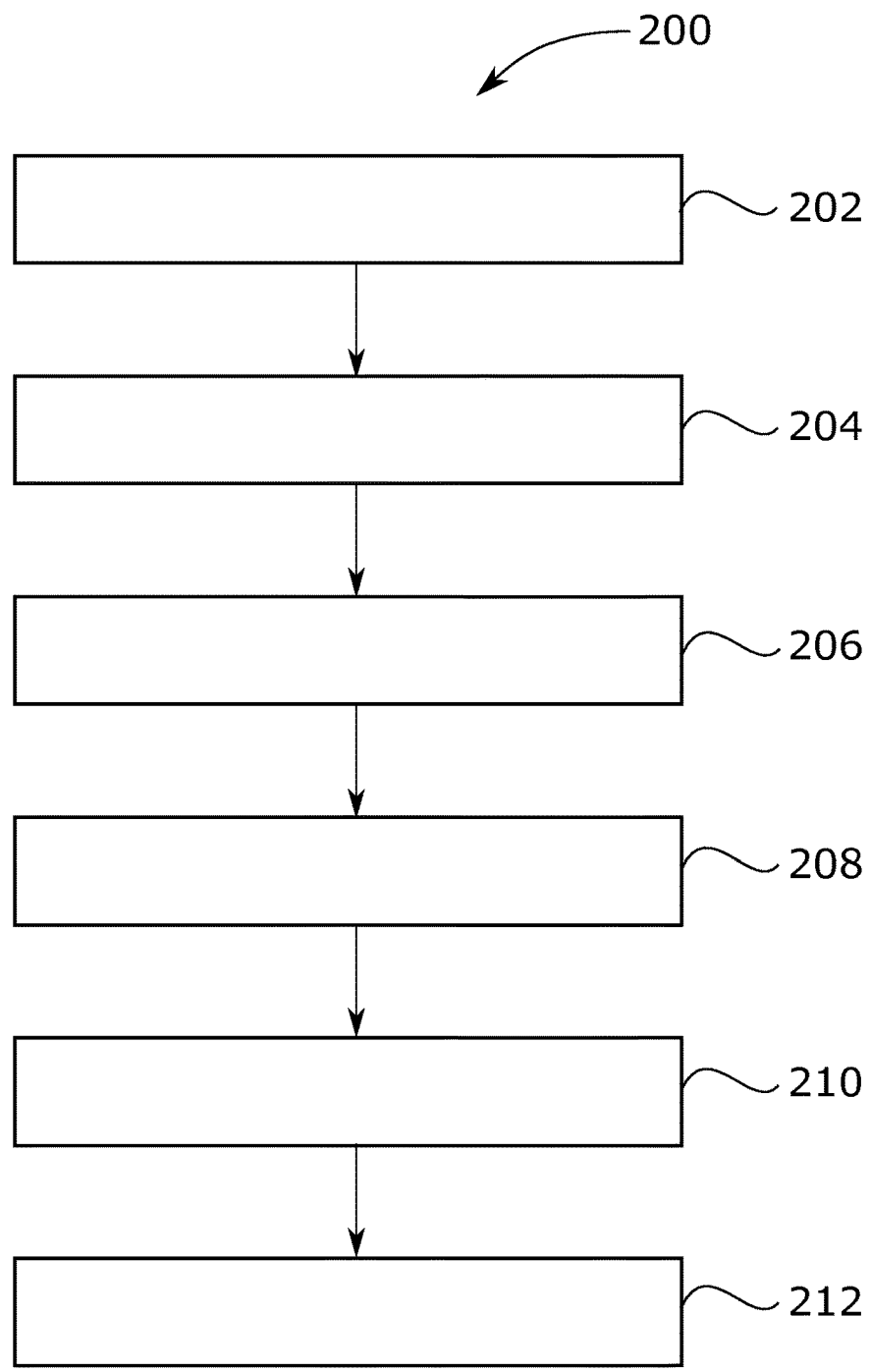
FIG. 5 shows a flow chart of the method according to the invention.

Finally, FIG. 5 shows a flow chart 200 of the method according to the invention. In this case, firstly the object representation of the examined object is ascertained in a first method step 202 according to the invention. For this purpose, a data carrier having a representation of the object stored thereon can be read out, or recordings can be performed in the form of a measurement of the object, for example, in the scope of a computer tomography examination. Distance values for data points 102 of a distance field, which code the geometry of the imaged object, are then ascertained from the items of image information of the object representation in step 204. Proceeding from this distance field, subsequently in step 206, a near region around a material boundary surface of the object is ascertained, for example, by defining a limiting value for distance values of data points or by selecting raster cells, within which a material boundary surface of the represented object extends. In a method step 208, a set of data points of the distance field, which are located outside the near region of the material boundary surface, is then ascertained proceeding from the previously ascertained near region. In method step 210, all of these data points are then deleted from the distance field and in step 212, the distance field thus reduced in its data volume is stored as a compressed object representation.

The invention is not restricted to one of the above-described embodiments, but rather is modifiable in manifold ways.

All of the features and advantages originating from the claims, the description, and the drawings, including design details, spatial arrangements, and method steps, can be essential to the invention both as such and also in greatly varying combinations.

LIST OF REFERENCE NUMERALS 100 material boundary surface
102 data point
104 band
106 elementary cell
108 raster cell
109 diagonal
110 raster cell
112 data point
114 data point
116 data point
118 data point It is claimed:

1. A computer-implemented method for compressing a digital representation of an object, wherein the object representation comprises a plurality of items of image information of the object, wherein an item of image information indicates a value of a measured variable for the object at a defined position of the object, wherein the method comprises the following steps:
   ascertaining the object representation,
   ascertaining a distance field from the items of image information of the object representation, wherein the distance field comprises a plurality of data points arranged in a raster, wherein the distance field assigns each of the data points at least one distance value, wherein each distance value specifies a spacing of the corresponding data point in relation to a material boundary surface of the object, wherein the spacing is perpendicular on the material boundary surface,
   ascertaining a near region around a material boundary surface of the object,
   ascertaining a subset of data points of the distance field which are located outside the near region of the material boundary surface,
   deleting the subset of data points from the distance field,
   storing the distance field as a compressed object representation.

2. The method as claimed in claim 1, characterized in that the raster of the distance field is an orthogonal grid.

3. The method as claimed in claim 1, characterized in that the raster of the distance field is an isotropic grid.

4. The method as claimed in claim 1, characterized in that the size of elementary cells of the raster of the distance field is locally different.

5. The method as claimed in claim 1, characterized in that the near region of a material boundary surface is defined by a limiting value for a distance value of a data point, wherein the respective distance values of the data points of the subset of data points are greater than the limiting value.

6. The method as claimed in claim 5, characterized in that the limiting value for the spacing corresponds to the maximum spacing between two points within a local elementary cell of the raster of the distance field, within which a material boundary surface extends.

7. The method as claimed in claim 5, characterized in that the limiting value for the distance is predetermined by a user input.

8. The method as claimed in claim 1, characterized in that the limiting value for the spacing has a different numeric value in each case for different regions of the object representation.

9. The method as claimed in claim 8, characterized in that the regions are defined by a user input.

10. The method as claimed in claim 1, characterized in that the ascertainment of the subset of data points comprises the following steps:
dividing the raster of the distance field into a plurality of raster cells (108), wherein one raster cell is delimited by data points at its respective corners,
ascertaining a subset of raster cells from the plurality of raster cells, within which a material boundary surface extends, and
assigning the data points, which do not delimit a raster cell from the subset of the raster cells to the subset of data points.

11. The method as claimed in claim 10, characterized in that the raster cells are elementary cells of a grid used as the raster.

12. The method as claimed in claim 10, characterized in that the ascertainment of the subset of raster cells comprises the following steps:
a) selecting one raster cell from the plurality raster cells,
b) ascertaining pairs of data points delimiting the raster cell,
c) ascertaining the relative spacing of the data points of the pairs from one another for each of the ascertained pairs,
d) ascertaining the sum of the distance values of the data points for each of the ascertained pairs,
e) if, for at least two of the pairs of the data points of the raster cell, the sum of the distance values is less than the ascertained relative spacing, assigning the raster cell to the subset of raster cells,
wherein steps a) to e) are repeated for the plurality of raster cells.

13. The method as claimed in claim 1, characterized in that the ascertainment of the distance field comprises the following steps:
ascertaining the location of material boundary surfaces from the items of image information of the object representation,
ascertaining a respective material boundary surface closest to a data point (102) for the data points of the distance field,
ascertaining the respective spacing of the data points from the respective closest material boundary surface, and
assigning the respective ascertained spacing to the respective data points as a distance value.

14. The method as claimed in claim 1, characterized in that the object representation is a rastered representation of the object, wherein the rastered representation comprises a plurality of measurement points of a measurement of the object arranged in a raster, wherein a measurement point comprises at least one item of image information.

15. The method as claimed in claim 14, characterized in that the measurement points in the rastered representation are arranged in a regular grid.

16. The method as claimed in claim 14, characterized in that the measurement is a computer tomography measurement, wherein the image information of a pixel indicates the x-ray density of the material of the object at the point of the pixel.

17. A non-transitory computer program product having instructions executable on a computer, which instructions, when executed on a computer, cause the computer to carry out the method as claimed in any claim 1.

* * * * *